US012647436B2

(12) United States Patent
Yarabolu

(10) Patent No.: US 12,647,436 B2
(45) Date of Patent: Jun. 2, 2026

(54) ADVERSARIAL MACHINE LEARNING ATTACK DETECTION AND PREVENTION SYSTEM

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 278 days.

(21) Appl. No.: 17/679,893

(22) Filed: Feb. 24, 2022

(65) Prior Publication Data

US 2023/0269263 A1 Aug. 24, 2023

(51) Int. Cl.
| | |
|---|---|
| *H04L 9/40* | (2022.01) |
| *G06F 18/214* | (2023.01) |
| *H04L 41/16* | (2022.01) |

(52) U.S. Cl.
CPC ...... *H04L 63/1425* (2013.01); *G06F 18/2155* (2023.01); *H04L 41/16* (2013.01); *H04L 63/1466* (2013.01)

(58) Field of Classification Search
None
See application file for complete search history.

(56) References Cited

U.S. PATENT DOCUMENTS

| | | | | |
|---|---|---|---|---|
| 10,686,811 | B1 * | 6/2020 | Ehle | ...................... G06N 20/00 |
| 11,176,495 | B1 | 11/2021 | Ron et al. | |

| | | | | |
|---|---|---|---|---|
| 11,188,646 | B2 | 11/2021 | Zhao et al. | |
| 11,379,855 | B1 * | 7/2022 | Anderson | .............. G06N 20/00 |
| 11,599,813 | B1 * | 3/2023 | Yuan | ...................... G06N 20/00 |
| 11,610,205 | B1 * | 3/2023 | Fain | .................. G06Q 20/1085 |
| 11,775,867 | B1 * | 10/2023 | Jamei | ...................... H04L 63/10 |
| | | | | 706/12 |
| 11,790,237 | B2 * | 10/2023 | Mathews | ............ G06F 16/9027 |
| | | | | 726/23 |
| 12,182,670 | B1 * | 12/2024 | Beauchesne | ........ H04L 63/1416 |
| 2016/0071017 | A1 * | 3/2016 | Adjaoute | ........... G06Q 20/4016 |
| | | | | 706/52 |
| 2016/0086185 | A1 * | 3/2016 | Adjaoute | ........... G06Q 20/4016 |
| | | | | 705/44 |
| 2016/0335435 | A1 | 11/2016 | Schmidtler et al. | |

(Continued)

*Primary Examiner* — Rupal Dharia
*Assistant Examiner* — Shadi H Kobrosli
(74) *Attorney, Agent, or Firm* — Banner & Witcoff, Ltd.

(57) ABSTRACT

A machine learning (ML) attack detection and prevention system may monitor operation of an explainable artificial intelligence (AI) model processed by an application server to provide a product or service to a user. The AI model outputs explainable data and/or other outputs used in decision making. The ML attack detection and prevention system derives business rules based on the explainable data produced by the explainable AI model. Additionally, the ML attack detection and prevention system processes rules repositories of simulation failure data, historical failure data and business rules to derive possible fraud rules based on the data collected in above step. Based on a comparison of rules derived from the AI model output and the possible fraud rules, the ML attack detection and prevention system issues an alert if a fraud condition is suspected and causes the application server to revert back to a previous version of the AI model.

20 Claims, 4 Drawing Sheets

100

(56)  References Cited

U.S. PATENT DOCUMENTS

| | | | |
|---|---|---|---|
| 2017/0124487 A1* | 5/2017 | Szeto | G06F 11/1448 |
| 2017/0262633 A1 | 9/2017 | Miserendino et al. | |
| 2018/0007074 A1 | 1/2018 | Kune et al. | |
| 2019/0235482 A1* | 8/2019 | Subramaniyan | G05B 23/0243 |
| 2020/0175320 A1* | 6/2020 | Panging | G06V 10/764 |
| 2020/0201727 A1* | 6/2020 | Nie | G06N 20/00 |
| 2020/0296124 A1* | 9/2020 | Pratt | H04L 63/20 |
| 2020/0380387 A1* | 12/2020 | Pourmohammad | G06N 5/04 |
| 2020/0380398 A1 | 12/2020 | Weider et al. | |
| 2021/0027864 A1 | 1/2021 | Plumbley et al. | |
| 2021/0158085 A1* | 5/2021 | Budzik | G06N 20/00 |
| 2021/0160281 A1* | 5/2021 | Hallaji | H04L 63/1491 |
| 2021/0209512 A1* | 7/2021 | Gaddam | H04L 63/1408 |
| 2021/0241169 A1 | 8/2021 | Gupta et al. | |
| 2021/0243226 A1* | 8/2021 | El Gamal | H04L 63/1416 |
| 2022/0078210 A1* | 3/2022 | Crabtree | G06F 16/9024 |
| 2022/0201042 A1* | 6/2022 | Crabtree | G06F 16/2477 |
| 2023/0124621 A1* | 4/2023 | Umesh | G06F 21/552 |
| | | | 726/23 |

* cited by examiner

100

104

| | Explainable Trust Score(0-10) | Model Decision Rules | Business Denied Rules |
|---|---|---|---|
| Credit Threshold | 7 | Positive | Positive |
| Collateral | 6 | Negative | Negative |
| Home Location | 8 | Positive | Positive |
| Rate Type | 10 | Negative | Negative |
| Loan Tenure | 4 | Negative | Positive |
| Debt Load | 10 | Negative | Negative |
| Insurance Coverage Score | 6 | Positive | Positive |
| Customer Age | 5 | Positive | Positive |
| Profession | 8 | Positive | Negative |
| Education | 5 | Positive | Positive |
| Down Payment | 6 | Negative | Positive |
| Current Investments | 7 | Positive | Positive |
| History of Past Repayments | 9 | Negative | Positive |
| Loan Amount | 4 | Positive | Positive |
| Spending Habits | 9 | Positive | Positive |
| Property Value | 10 | Positive | Positive |
| Decision | | Reject | Approve |

FIG. 3

ADVERSARIAL MACHINE LEARNING ATTACK DETECTION AND PREVENTION SYSTEM

BACKGROUND

In an attempt to keep ahead of enterprise security measures, attackers continually adapt their methods to not allow enterprise network security procedures sufficient time to adapt. Because sophisticated means of intercepting encrypted files are currently available, perpetrators may focus on alternative ways of avoiding data security. Currently machine learning (ML) and artificial intelligence (AI) are gaining more prominence and acceptance. In near future ML/AI processes will increasingly be incorporated into much of the customer-facing software and/or computing services, such as to improve customer experience, to streamline authentication procedures, to intelligently implement business decisions and the like. Because of the increasing implementation of ML/AI functionality, these ML/AI applications and services are more vulnerable for attacks. For example, a major attack of ML/AI applications and services may include improperly training of the model with deceptive inputs so that model malfunctions and implements malicious decisions adverse to the enterprise organization. Such attacks may particularly occur with online learning systems and/or genetic algorithms, where the model evolves over the time in real time with the changing business inputs. Currently there is no in-built security mechanism in ML/AI computing systems that could detect and/or prevent such an adversarial machine learning attack.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure provide solutions that address and overcome technical problems associated with vulnerabilities of machine learning and artificial intelligence based software and applications. In particular, one or more aspects of the disclosure relate to detection and prevention of ML/AI based attacks involving malicious training of the ML/AI model.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes identification, detection and prevention of ML/AI based attacks involving malicious training of an ML/AI model.

An adversarial machine learning attack detection and prevention system may be implemented by building an explainable AI model that may output factors (e.g., explainable data) involved in a decision-making process (e.g., a loan application approval process, and the like). The AI model may derive explainable rules based on factors from which any business-based rules and/or decisions may be removed from the output. Rules repositories storing simulation failure data, historical failure data such as those associated with fraud, and/or listings of business rules built into ML/AI models may be utilized by the adversarial machine learning attack detection and prevention system. Additionally, possible fraud-derived rules may be derived based on information stored in the rules repositories. The explainable rules may then be compared with the derived fraud-generated rules, where, if an indication is found that the derived rules match, or nearly match, a fraud-associated rule set, the ML attack detection and prevention system issues an alert if a fraud condition is suspected and causes the application server to revert back to a previous version of the AI model.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 shows an illustrative example of adversarial machine learning attack detection scores in accordance with one or more aspects described herein.

DETAILED DESCRIPTION

Figure 1A:
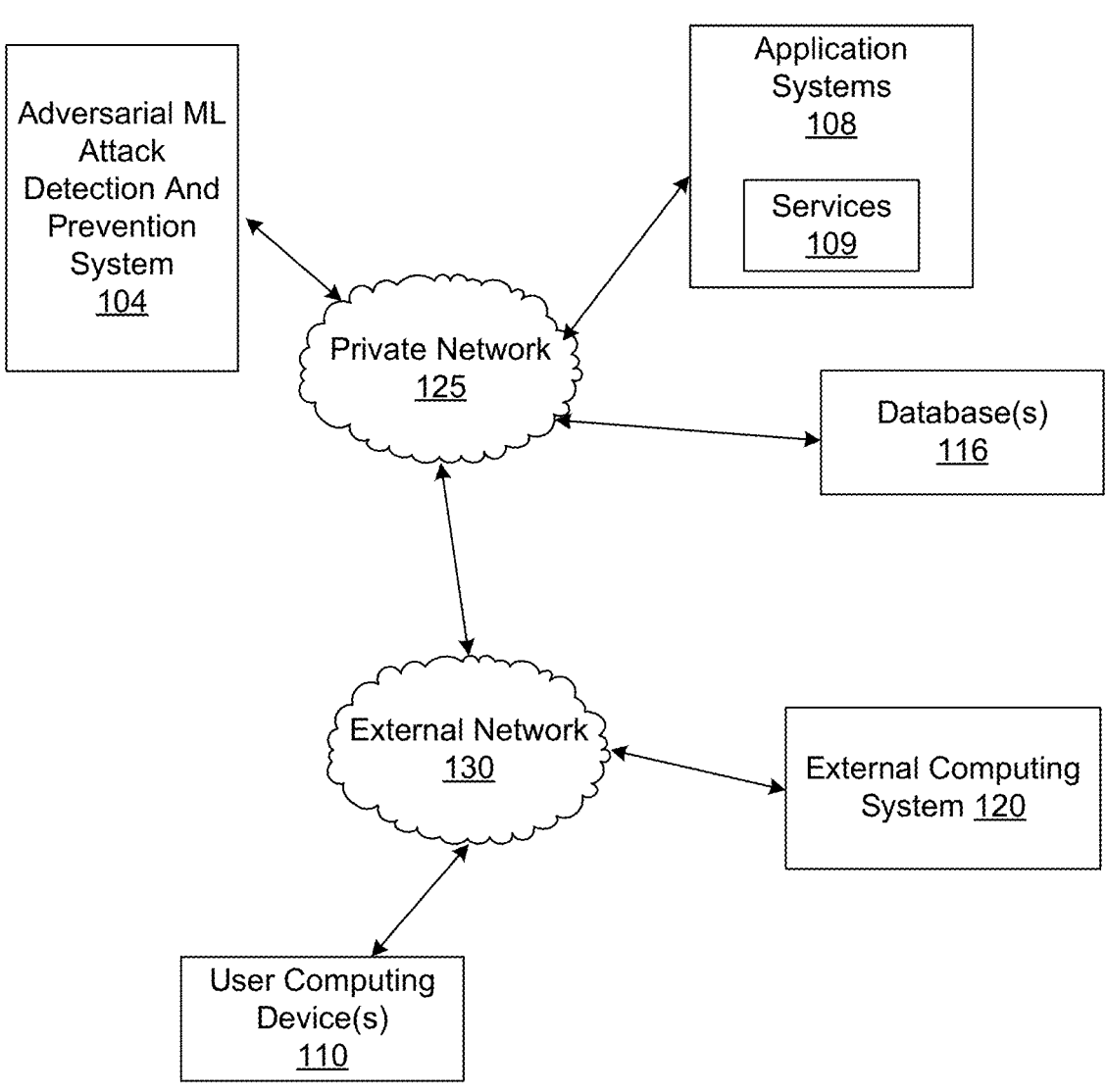
FIG. 1A shows an illustrative computing environment for detection and prevention of ML/AI model based attacks, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

With the development of machine learning (ML), expectations for artificial intelligence (AI) technology are increasing day by day. In particular, machine learning has shown enriched performance results in a variety of systems and applications, where many applications are closely related to commonly provided products and services. In some cases, an AI system may continually train underlying ML models during operations, such as to improve predictions and/or classifications, to improve the operations of the particular product and/or service provided. If an ML model causes mispredictions or misclassifications due to malicious external influences, such errors may cause catastrophic complications. Moreover, runtime training of ML models involves use and adaptation based on input received during operation. As such, malicious attacks of an enterprise computing system may be initiated via unauthorized training the ML/AI model with deceptive inputs so that model malfunctions and takes malicious decisions that could impact the security of the enterprise computing system. Online learning systems or genetic algorithms may be susceptible to such attacks because the model evolves in real-time as per the changing business inputs and operations. Currently there is no built in security mechanism for ML/AI-based systems that could detect and prevent such adversarial machine learning attacks. As such, there exists a need for a new and modified ML/AI model analysis technology.

In some cases, an enterprise computing system may include an adversarial machine learning attack detection and prevention computing system that builds an explainable ML/AI model that outputs factors involved in decision making of a real-time production ML/AI model. The adversarial machine learning attack detection and prevention computing system may derive business rules based on the derived factors produced by model. Additionally, the adversarial machine learning attack detection and prevention computing system may maintain and build rules repositories of simulation failure data, historical failure data (e.g., examples of fraud identified in one or more computing systems) and business rules. The adversarial machine learning attack detection and prevention computing system may then derive fraud rules based on the data collected in the rules repositories of simulation failure data, the repository storing historical failure data (e.g., examples of fraud identified in one or more computing systems) and/or the repository storing business rule information. The adversarial machine learning attack detection and prevention computing system may compare the derived fraud rules with the derived business rules (e.g., the explainable AI rules) to identify whether the production ML/AI model has been subject to a malicious adversarial attack. For example, if the AI generated rules are matching with fraud rules, the adversarial machine learning attack detection and prevention computing system may stop the decision process, generate an error and cause the production system to revert back to a last known good model for use in decisioning functions. Additionally, adversarial machine learning attack detection and prevention computing system does not identify a match, the monitoring process continues and/or a copy of the present ML/AI model may be stored with a timestamp as a "known good model".

Here, the adversarial machine learning attack detection and prevention computing system provides automated detection and mitigation of adversarial ML-based attacks while providing real-time auditing of ML model output to detect fraud and/or anomalies involved in model decisioning processes.

FIG. 1A shows an illustrative computing environment 100 for automated detection and mitigation of adversarial ML-based attacks, in accordance with one or more arrangements. The computing environment 100 may comprise one or more devices (e.g., computer systems, communication devices, and the like). The computing environment 100 may comprise, for example, an adversarial ML attack detection and prevention system 104, one or more application system 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise an external computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the adversarial ML attack detection and prevention system 104 and the application systems 108 as separate computing systems, the adversarial ML attack detection and prevention system 104 may be integrated into one or more of the application systems 108.

The adversarial ML attack detection and prevention system 104 may comprise one or more computing devices and/or other computer components (e.g., processors, memories, communication interfaces) configured to perform one or more functions as described herein. Further details associated with the architecture of the adversarial ML attack detection and prevention system 104 are described with reference to FIG. 1B.

The application system(s) 108 may comprise one or more computing devices and/or other computer components (e.g., processors, memories, communication interfaces). In addition, the application system 108 may be configured to host, execute, and/or otherwise provide one or more enterprise applications. In some cases, the application systems 108 may host one or more services 109 configured facilitate operations requested through one or more API calls, such as data retrieval and/or initiating processing of specified functionality. In some cases, an external computing system 120 may be configured to communicate with one or more of the application systems 108 via API function calls and the services 109. In an arrangement where the private network 125 is associated with a financial institution computing system (e.g., a banking computing system), the application systems 108 may be configured, for example, to host, execute, and/or otherwise provide one or more transaction processing programs, such as an online banking application, fund transfer applications, and/or other programs associated with the financial institution. The application systems 108 may comprise various servers and/or databases that store and/or otherwise maintain account information, such as financial account information including account balances, transaction history, account owner information, and/or other information. In addition, the application systems 108 may process and/or otherwise execute transactions on specific accounts based on commands and/or other information received from other computer systems comprising the computing environment 100. In some cases, one or more of the application systems 108 may be configured, for example, to host, execute, and/or otherwise provide one or more transaction processing programs, such as electronic fund transfer applications, online loan processing applications, and/or other programs associated with the financial institution.

The application systems 108 may be one or more host devices (e.g., a workstation, a server, and the like) or mobile computing devices (e.g., smartphone, tablet). In addition, an application systems 108 may be linked to and/or operated by a specific enterprise user (who may, for example, be an employee or other affiliate of the enterprise organization) who may have administrative privileges to perform various operations within the private network 125. In some cases, the application system 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

In some cases, one or more application systems may comprise one or more computing devices and/or other computer components (e.g., processors, memories, communication interfaces) configured to host, execute, and/or otherwise provide one or more processes integrating AI functionality processing one or more ML/AI models to facilitate one or more transaction processing programs, such as goods ordering applications, electronic fund transfer applications, online loan processing applications, and/or other programs associated with providing a product or service to a user, and/or the like. With reference to the example where an application system is for processing an electronic exchange of goods and/or services. The application system may be associated with a specific goods purchasing activity, such as purchasing a vehicle, transferring title of real estate may perform communicate with one or more other platforms within the computing system 100. In some cases, the client application system may integrate API calls to request data, initiate functionality, or otherwise communicate with the one or more application systems 108, such as via the services 109. For example, the services 109 may be configured to facilitate data communications (e.g., data gathering functions, data writing functions, and the like) between the application system and the one or more other application systems 108. In some cases, the AI functionality processed by the application system may be configured to adapt the ML/AI models in real-time based on inputs received to the system, such as commands received via the external network 130 from one or more user computing devices 110 and/or at least one external computing system 120.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the adversarial ML attack detection and prevention system 104. For example, the database(s) 116 may store simulation failure data, historical failure data, business rules information, and the like. In an arrangement, the database(s) 116 may be used for other purposes as described herein.

In one or more arrangements, the adversarial ML attack detection and prevention system 104, the application systems 108, the external computing system 120, the user devices 110, and/or the other devices/systems in the computing environment 100 may be any type of computing device capable of receiving input via a user interface, and communicating the received input to one or more other computing devices in the computing environment 100. For example, the adversarial ML attack detection and prevention system 104, the application systems 108, the external computing system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the adversarial ML attack detection and prevention system 104, the application systems 108, the external computing system 120, the user devices 110, and/or the other devices/systems in the computing environment 100 may, in some instances, be and/or comprise special-purpose computing devices configured to perform specific functions.

Figure 1B:
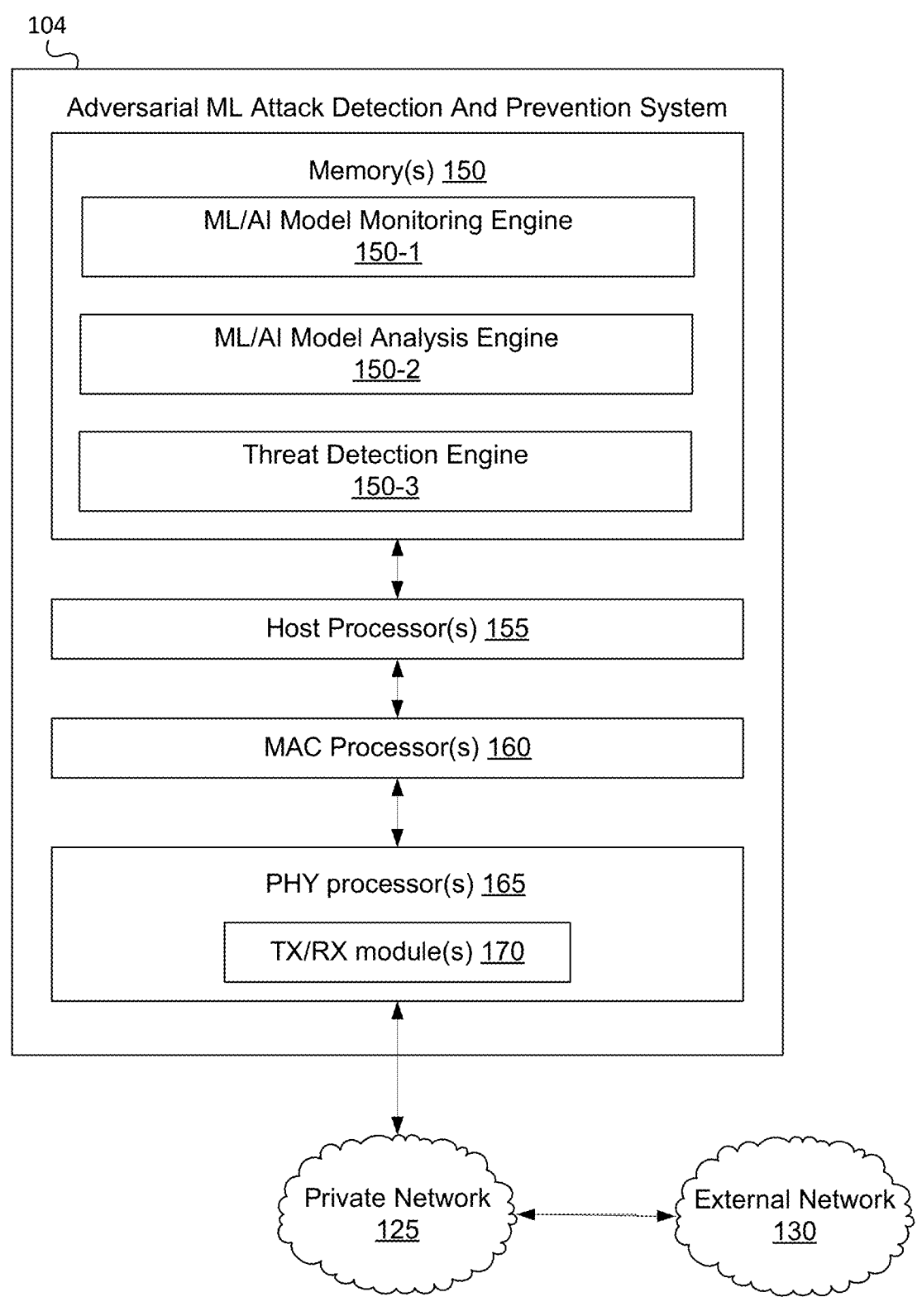
FIG. 1B shows an illustrative computing platform enabled for detection and prevention of ML/AI model based attacks, in accordance with one or more aspects described herein.

FIG. 1B shows an illustrative adversarial ML attack detection and prevention system 104 in accordance with one or more examples described herein. The adversarial ML attack detection and prevention system 104 may be a stand-alone device and/or may at least be partial integrated with the adversarial ML attack detection and prevention system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The API Route Testing System 105 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the adversarial ML attack detection and prevention system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the adversarial ML attack detection and prevention system 104 may be configured to execute machine readable instructions stored in memory 150. The memory 150 may comprise (i) one or more program modules/engines having instructions that when executed by the one or more processors cause the adversarial ML attack detection and prevention system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the adversarial ML attack detection and prevention system 104 and/or by different computing devices that may form and/or otherwise make up the adversarial ML attack detection and prevention system 104. For example, the memory 150 may have, store, and/or comprise an ML/AI model monitoring engine 150-1, an ML/AI model analysis engine 150-2, a threat detection engine 150-3, and/or the like. The ML/AI model monitoring engine 150-1 may have instructions that direct and/or cause the adversarial ML attack detection and prevention system 104 to perform one or more operations associated with monitor operation and execution of an ML/AI model that changes over time (e.g., in real-time, periodically, and the like) to identify learned business rules or other indicators of ML/AI model evolution based on learned inputs. The ML/AI model analysis engine 150-2 may have instructions that may cause the adversarial ML attack detection and prevention system 104 to perform operations associated with analyzing stored business rules and/or other information such as historical model simulation information, historical model failure information (e.g., model information obtained and identifying a fraudulent operation) and/or the like. The threat detection engine 150-3 may have instructions that direct and/or cause the adversarial ML attack detection and prevention system 104 to perform operations associated with analyzing information generated by the ML/AI model monitoring engine 150-1, the ML/AI model analysis engine 150-2, and/or other information, to determine whether an operational ML/AI model has been compromised and if so, generate a threat notification, revert the operational model to a previously "known good" model version, and/or store information associated with the fraudulently trained model in the database(s) 116. In some cases, if the model is determined to be operating normally, a version of the currently active model may be stored (with a timestamp or other sequential indicator) as a "known good" model for future restoration, if needed.

While FIG. 1A illustrates the adversarial ML attack detection and prevention system 104 and/or the application systems 108, as being separate elements connected in the private network 125, in one or more other arrangements, functions of one or more of the above may be integrated in a single device/network of devices. For example, elements in the API route testing system 105 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the adversarial ML attack detection and prevention system 104, and/or the application systems 108.

Figure 2:
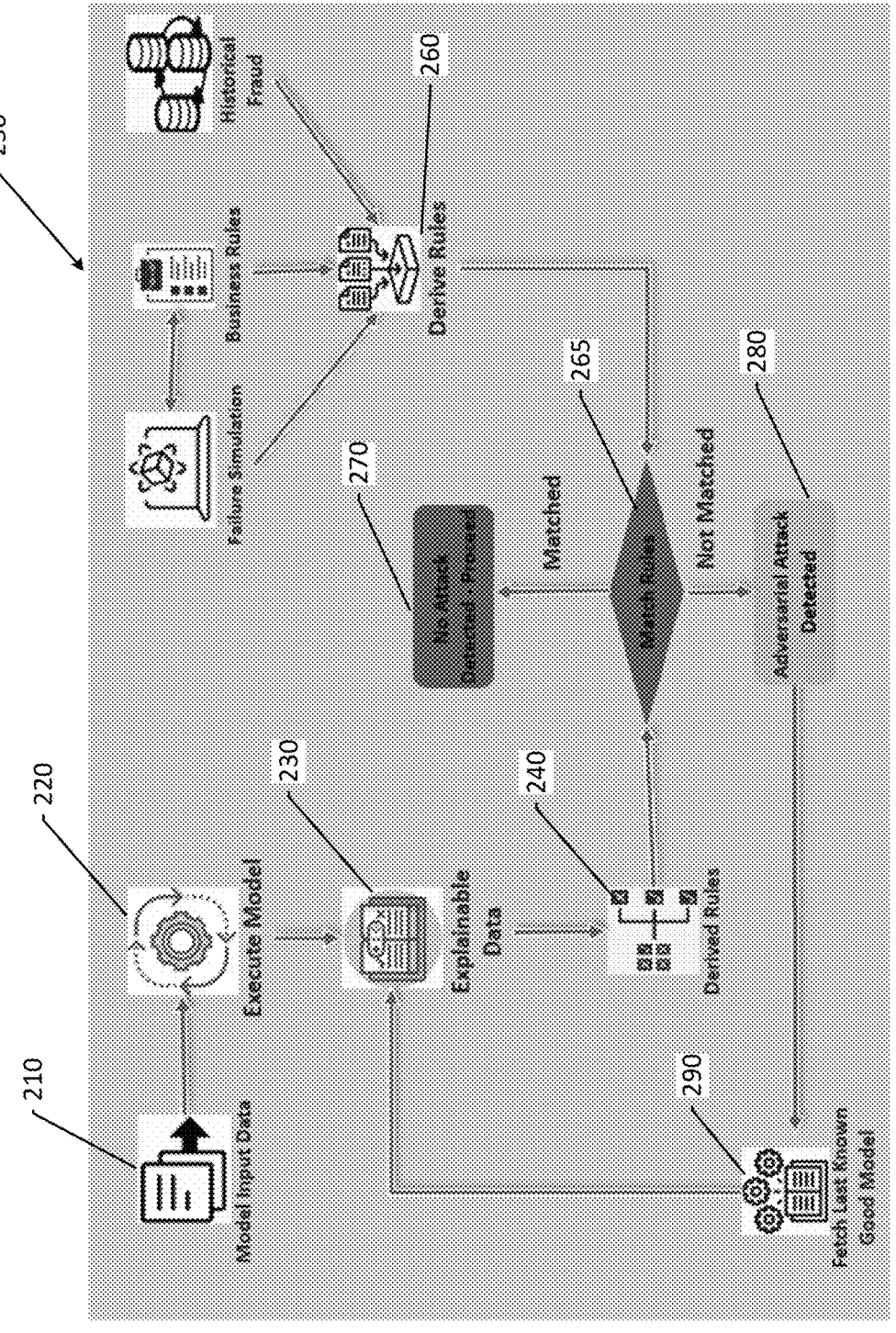
FIG. 2 shows an illustrative process for detection and prevention of ML/AI model based attacks, in accordance with one or more example arrangements.

FIG. 2 shows an illustrative process for detection and prevention of ML/AI model based attacks, in accordance with one or more example arrangements. At 210, model input data may be received by an application 108 and processed at 220 by an integrated ML/AI model to perform artificial intelligence-based functionality as requested by a user (e.g., user input is processed in determining whether a loan application is to be approved). At 230, the application server 108 may output explainable data illustrative of learned AI logic performed by processing the ML/AI model. At 240, the ML/AI model monitoring engine 150-1 may monitor operation of the application 108 for an indication of new explainable data output by the ML/AI model. The ML/AI model monitoring engine 150-1 may then analyze the explainable data to derive rules as performed by the ML/AI model as an indication of the status of the learned model.

At 250, the ML/AI model analysis engine 150-2, may analyze simulation information (e.g., simulated output of the ML/AI model based on one or more simulated malicious attack inputs), business rules, and/or historical failure information (e.g., information associated with known and captured malicious ML/AI model attack attempts), to derive a rule set indicative of a malicious attack at 260. At 265, the threat detection engine 150-3 may analyze the derived rules received from each of the ML/AI model monitoring engine 150-1 and the ML/AI model analysis engine 150-2. If, at 265, the threat detection engine 150-3 identifies that no attack has occurred, operation of the application system 108 may proceed as normal. In some cases, the threat detection engine 150-3 may cause storage of the currently operational ML/AI model in a datastore 116 as a "known good" version of the ML/AI model. If, however, at 265 the threat detection engine identifies an indication that an adversarial attack has occurred, such as by malicious training of the ML/AI model via fraudulent input(s), the threat detection engine 150-3 may generate an alert (e.g., an email notification, a shutdown notification, a pop-up message at a user device, a visual or audio alert on a user device that indicates that the ML/AI model has been compromised. In some cases, the threat detection engine 150-3 may automatically cause generation of an alert and/or initiate other actions For example, the threat detection engine 150-3 may shut down or temporarily pause operation of the application server 108 so that the ML/AI model that has been identified as being compromised can be stored in a data store as a historical indication of ML/AI model failure, and/or the threat detection engine 150-3 may activate or cause activation of a known good ML/AI model (e.g., a newest ML/AI model known to be operating as expected.

FIG. 3 shows an illustrative example of adversarial machine learning attack detection scores in accordance with one or more aspects described herein. For example, the illustrative data of FIG. 3 illustrates possible differences in models due to malicious and/or fraudulent training of an ML/AI model. Such differences in explainable data, with or without a confidence or trust score, may be used to identify possible malicious training of the ML/AI model. In cases, the threat detection engine 150-3 may process the model decision rule differences with weighting factors (e.g., the explainable trust score) to determine whether malicious training has occurred. In some cases, the threat detection engine 150-3 may weigh the model differences, based on the explainable trust scores, to identify differences that may lead to greater likelihood of a positive output (e.g., a loan approval, and the like) from the model based on the particular set of inputs. In some cases, if a possible malicious training event is identified, the threat detection engine 150-3 may cause processing of the same input set by an iteration of a "known good" model iteration to verify the results (e.g., identify whether the inputs would cause an opposite result of the model output).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:

an application server processing a current iteration of a machine learning (ML) model based on model inputs received by the application server;

an adversarial ML attack detection and prevention system, comprising:

at least one processor; and memory storing computer-readable instructions that, when executed by the at least one processor, cause the adversarial ML attack detection and prevention system to:

derive, based on output from the current iteration of the ML model communicated from the application server, one or more first derived business rules, wherein the first derived business rules comprise a current model rule set as performed by the current iteration of the ML model, wherein the current model rule set evolved over time;

identify, based on a combination of output of a failure ML model simulation and historical data comprising historical malicious attack information, one or more second derived business rules, wherein the failure ML model simulation comprises use of the ML model with simulated malicious model training attack inputs and wherein the one or more second derived business rules comprises a rule set indicative of a trained rule set after a malicious model training attack and is a combination of third rules derived based on output of the ML model after processing the simulated malicious model training attack inputs and fourth rules derived from historical model training attack information;

compare the first derived business rules with the second derived business rules, wherein the second derived business rules comprise a ruleset indicative of the trained model rule set as performed by the ML model after a malicious model training attack; and trigger, based on an indication of a malicious model training event comprising a match between a first derived rule set comprising the one or more first derived business rules and a second derived rule set comprising the one or more second derived business rules, an activation of a previous version of the ML model, wherein the match comprises an indication of malicious training of the ML model.

2. The system of claim 1, wherein the instructions further cause the adversarial ML Attack detection and prevention system to:

receive, via a network connection from the application server, a first explainable data set output from the current iteration of the ML model based on processing of the model inputs; and derive, based on analysis of the explainable data set output by the model, the first derived business rules comprising a first set of business rules representative of a current iteration of an evolved business rule set currently processed by the current iteration of the ML model, wherein the first set of business rules comprises the one or more first derived business rules.

3. The system of claim 1, wherein the instructions further cause the adversarial ML Attack detection and prevention system to:

receive, via a network, a copy of the model inputs received by the application server;

input, to a previous iteration of the ML model, the model inputs;

output, from the previous iteration of the ML model, a second explainable data set; and derive, based on the second explainable data set, a stored business rule set associated with the previous iteration of the ML model, and information corresponding to historical instances of identified malicious activity, a second set of derived business rules comprising the one or more second derived business rules.

4. The system of claim 1, wherein the indication of a malicious model training event comprises an unmatched set of business rules based on a comparison of the one or more first derived business rules with the one or more second derived business rules.

5. The system of claim 1, wherein the instructions further cause the adversarial ML Attack detection and prevention system to:

initiate storage, by the application server based on matching of the one or more first derived business rules with the one or more second derived business rules, a copy of the current iteration of the ML model labeled as a known good model.

6. The system of claim 1, wherein the instructions further cause the adversarial ML Attack detection and prevention system to:

label, based on matching of the one or more first derived business rules with the one or more second derived business rules, the current iteration of the ML model as a known good model; and receive, from the application server based on the matching of the one or more first derived business rules with the one or more second derived business rules, a copy of the current iteration of the ML model labeled as the known good model.

7. The system of claim 6, wherein the instructions further cause the adversarial ML Attack detection and prevention system to initiate use of the copy of the current iteration of the ML model during simulation of an ML model failure.

8. The system of claim 1, wherein the instructions further cause the adversarial ML Attack detection and prevention system to:

store, after triggering activation of a previous version of the ML model and in a data store as historical malicious attack information, the one or more first derived business rules.

9. An adversarial machine learning (ML) attack detection and prevention platform, comprising:

at least one processor; and memory storing computer-readable instructions that, when executed by the at least one processor, cause the adversarial ML attack detection and prevention platform to:

receive, via a network, data output from a current iteration of an ML model processed by an application server based on model inputs received via an interface of the application server;

derive, based on the data output from the current iteration of the ML model communicated from the application server, one or more first derived business rules, wherein the first derived business rules comprise a current model rule set as performed by the current iteration of the ML model, wherein the current model rule set evolved over time;

identify, based on a combination of output of a failure ML model simulation and historical data comprising historical malicious attack information, one or more second derived business rules, wherein the failure ML model simulation comprises use of the ML model with simulated malicious model training attack inputs and wherein the one or more second derived business rules comprises a rule set indicative of a trained rule set after a malicious model training attack and is a combination of third rules derived based on output of the ML model after processing the simulated malicious model training attack inputs and fourth rules derived from historical model training attack information;

compare the first derived business rules with the second derived business rules, wherein the second derived business rules comprise a rule set indicative of the trained model rule set as performed by the ML model after a malicious model training attack; and trigger, based on an indication of a malicious model training event comprising a match between a first derived rule set comprising the one or more first derived business rules and a second derived rule set comprising the one or more second derived business rules, an activation of a previous version of the ML model by the application server, wherein the match comprises an indication of malicious training of the ML model.

10. The adversarial ML attack detection and prevention platform of claim 9, wherein the instructions further cause the adversarial ML Attack detection and prevention platform to:

receive, via a network connection from the application server, a first explainable data set output from the current iteration of the ML model based on processing of the model inputs; and derive, based on analysis of the first explainable data set, a first set of business rules representative of an evolved business rule set currently processed by the current iteration of the ML model, wherein the first set of business rules comprises the one or more first derived business rules.

11. The adversarial ML attack detection and prevention platform of claim 9, wherein the instructions further cause the adversarial ML Attack detection and prevention system to:

receive, via a network, a copy of the model inputs received by the application server;

input, to a previous iteration of the ML model, the model inputs;

output, from the previous iteration of the ML model, a second explainable data set; and derive, based on the second explainable data set, a stored business rule set associated with the previous iteration of the ML model, and information corresponding to historical instances of identified malicious activity, a second set of derived business rules comprising the one or more second derived business rules.

12. The adversarial ML attack detection and prevention platform of claim 9, wherein the indication of a malicious model training event comprises an unmatched set of business rules based on a comparison of the one or more first derived business rules with the one or more second derived business rules.

13. The adversarial ML attack detection and prevention platform of claim 9, wherein the instructions further cause the adversarial ML Attack detection and prevention system to:

initiate storage, by the application server based on matching of the one or more first derived business rules with the one or more second derived business rules, a copy of the current iteration of the ML model labeled as a known good model.

14. The adversarial ML attack detection and prevention platform of claim 9, wherein the instructions further cause the adversarial ML Attack detection and prevention system to:

receive, from the application server based on matching of the one or more first derived business rules with the one or more second derived business rules, a copy of the current iteration of the ML model labeled as a known good model.

15. The adversarial ML attack detection and prevention platform of claim 14, wherein the instructions further cause the adversarial ML Attack detection and prevention system to initiate use of the copy of the current iteration of the ML model during simulation of an ML model failure.

16. The adversarial ML attack detection and prevention platform of claim 9, wherein the instructions further cause the adversarial ML Attack detection and prevention system to:

store, after triggering activation of a previous version of the ML model and in a data store as historical malicious attack information, the one or more first derived business rules.

17. A method comprising:

processing, by an application server processing a current iteration of a machine learning (ML) model, inputs received via an interface;

receiving, from the application server and by an adversarial ML attack detection and prevention system, model outputs comprising explainable data;

deriving, based on output from the current iteration of the ML model communicated from the application server, one or more first derived business rules, wherein the first derived business rules comprise a current model rule set as performed by the current iteration of the ML model, wherein the current model rule set evolved over time;

identifying, based on a combination of output of a failure ML model simulation and historical data comprising historical malicious attack information, one or more second derived business rules, wherein the failure ML model simulation comprises use of the ML model with simulated malicious model training attack inputs and wherein the one or more second derived business rules comprises a rule set indicative of a trained rule set after a malicious model training attack and is a combination of third rules derived based on output of the ML model after processing the simulated malicious model training attack inputs and fourth rules derived from historical model training attack information;

comparing the first derived business rules with the second derived business rules, wherein the second derived business rules comprise a rule set indicative of the trained model rule set as performed by the ML model after a malicious model training attack; and triggering, automatically by the adversarial ML attack detection and prevention system based on an indication of a malicious model training event comprising a match between a first derived rule set comprising the one or more first derived business rules and a second derived rule set comprising the one or more second derived business rules, an activation of a previous version of the ML model, wherein the match comprises an indication of malicious training of the ML model.

18. The method of claim 17, comprising:

initiate storage, by the application server based on matching of the one or more first derived business rules with the one or more second derived business rules, a copy of the current iteration of the ML model labeled as a known good model.

19. The method of claim 17, comprising:

receiving, via a network, a copy of the model inputs received by the application server;

processing, by a previous iteration of the ML model, the model inputs;

outputting, from the previous iteration of the ML model, a second explainable data set; and deriving, automatically and based on the second explainable data set, a stored business rule set associated with the previous iteration of the ML model, and information corresponding to historical instances of identified malicious activity, a second set of derived business rules comprising the one or more second derived business rules.

20. The method of claim 17, comprising:

receiving, via a network connection from the application server, a first explainable data set output from the current iteration of the ML model based on processing of the model inputs; and deriving, based on analysis of the explainable data set, a first set of business rules representative of an evolved business rule set currently processed by the current iteration of the ML model, wherein the first set of business rules comprises the one or more first derived business rules.

\* \* \* \* \*